United States Patent
Renner

[15] 3,666,978
[45] May 30, 1972

[54] SIDE PORTED INLET COVER FOR GENERATORS

[72] Inventor: Glen R. Renner, Anderson, Ind.

[73] Assignee: General Motors Corporation, Detroit, Mich.

[22] Filed: Nov. 25, 1970

[21] Appl. No.: 92,638

[52] U.S. Cl. ............................310/62, 310/65, 310/68.4, 310/89
[51] Int. Cl. ..........................................H02k 9/06
[58] Field of Search ..................310/64, 65, 62, 63, 68 D, 89

[56] References Cited

UNITED STATES PATENTS

| | | | |
|---|---|---|---|
| 3,538,362 | 11/1970 | Cheetham et al. | 310/68 D |
| 2,156,958 | 5/1939 | Aydelott | 310/63 X |
| 3,078,409 | 2/1963 | Bertsche et al. | 310/68 D X |
| 3,539,848 | 11/1970 | Dosch et al. | 310/64 |

Primary Examiner—L. T. Hix
Assistant Examiner—B. A. Reynolds
Attorney—E. E. Christen, C. R. Meland and A. F. Duke

[57] ABSTRACT

A cylindrical-like cover, the end of which is impervious to air flow and the axially extending sides of which have ports, is adapted to be removably attached to one side of a ducted end wall of an alternator housing. A voltage regulator and rectifier comprised of semiconductors are attached to the other side of the end wall in proximity to the air ducts and are cooled by means of a fan that draws air in radially through the ports in the cover when attached and axially through the ducts in the end wall. Debris of a size greater than the ports or a momentum in excess of that which can be overcome by the suction of the alternator fan is blown over the exterior of the alternator and cover by the motor fan. This prevents debris from clogging the end wall and the ducts therein, reduces the tendency of the semiconductor to overheat from the effects of such clogging, and avoids possible charging system faults associated therewith.

1 Claim, 3 Drawing Figures

Patented May 30, 1972  3,666,978

INVENTOR.
Glen R. Renner
BY
Albert F. Duke
ATTORNEY

INVENTOR.
Glen R. Renner
BY
Albert F. Duke
ATTORNEY

SIDE PORTED INLET COVER FOR GENERATORS

This invention relates to means for preventing dirt and debris from decreasing the transfer of heat from semiconductors located within the housing of an alternator.

Through the use of semiconductors, the voltage regulator and full wave bridge rectifier units for a vehicle charging system have been reduced in size to permit their location within the housing of the alternator. To effect satisfactory operation, the semiconductors must be operated below certain temperatures and, therefore, must be cooled by air drawn over both the units in which they are enclosed and over the structures to which they conduct heat. For maximum cooling efficiency, the regulator and rectifier have, therefore, been located on the interior of a ducted end wall of the alternator housing so that heat may be transferred both by conduction to the end wall and by convection to the air drawn over the end wall, through the ducts, and over the units. By locating the units on the end wall this increases the surface contact area between the units and housing as well as the projected area of the units impinged upon by the air through the ducts.

Several environments in which the alternator is used, such as in farming and earth-moving, are of a nature that dirt, straw, and even oil deposits may be caked on the end wall and may therefore reduce the transfer of heat from the semiconductors to a point where the voltage regulator provides inadequate regulation of the alternator output voltage and ultimately fails or the diodes comprising the rectifier bridge also overheat and ultimately fail. For example, the foreign matter on the end housing may thus increase the resistance to thermal conduction therefrom and by blocking the axial ducts reduce the quantity of air that can be drawn through the alternator by its fan. A further condition reducing the transfer of heat from the voltage regulator and rectifier is the radiation of heat to them from external structures of higher temperatures such as the exhaust manifold or even the sun.

It is, therefore, desirable to avoid the reduction of heat transfer from the semiconductors mounted within the housing of an alternator where operated in the presence of dirt, debris and heat radiating sources, and it is also desirable to avoid such reduction by inexpensive means that may be readily attached to a standard alternator.

It is, therefore, a primary object of the present invention to provide a protective cover adapted to be attached over the exterior of an axially ducted end wall of an alternator housing, the interior of which supports semiconductors that are cooled by air drawn by the alternator fan through ports in the cover and ducts in the end wall.

It is another object of the present invention to provide a cover of the foregoing type that is ported only on the cylindrical sides thereof with apertures sufficiently small to prevent foreign matter of a size larger than the openings and blown over the sides of the alternator by the motor fan from being drawn onto the end wall and into the ducts therethrough.

It is a further object of the present invention to affix over the exterior of an end wall, the interior of which supports a semiconductor, a cover that protects the end wall and semiconductor from exposure to heat radiated from structures of higher temperatures.

It is a further object of the present invention to provide a protective cover of the foregoing type that is adapted to be readily attached to the exterior of a standard alternator.

These and other objects of the present invention are obtained by a shallow cylindrical cover attached concentrically over the exterior of the end wall of an alternator housing by means of a bolt securing the cover to the end wall and also by means of snaps on the sides of the cover that engage the drain holes in the end wall of the housing. The sides of the cover substantially encompass the perimeter of the end wall and are perforated with openings. Air blown over the sides of the alternator housing by the motor fan is drawn by the alternator fan through radial perforations in the sides of the cover and through axial ducts in the end wall over a voltage regulator and rectifier affixed to the interior of the end wall.

These and other detailed objects and advantages of the present invention will become apparent from the following description taken with reference to the drawings, wherein.

Figure 1:
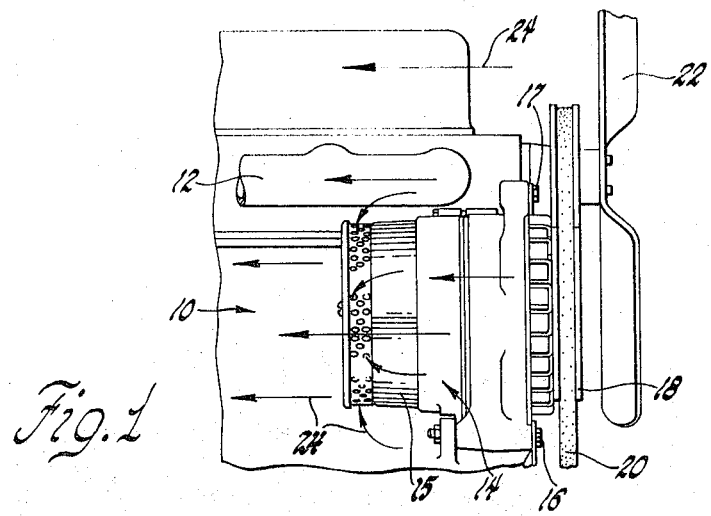
FIG. 1 shows a typical alternator affixed to the engine of a vehicle in proximity to the exhaust manifold and motor fan thereof and having the protective cover in accordance with the subject invention affixed to the exterior of the end wall thereof.

With reference now more particularly to FIG. 1 there is shown an engine 10 having affixed thereto an exhaust manifold 12 and an alternator 14 secured by bolts 16 and 17. Alternator 14 is driven at pulley 18 by a belt 20 that also drives motor fan 22 to blow an air stream in the direction of arrows 24 over exhaust manifold 12 and sides 15 of alternator 14.

Figure 2:
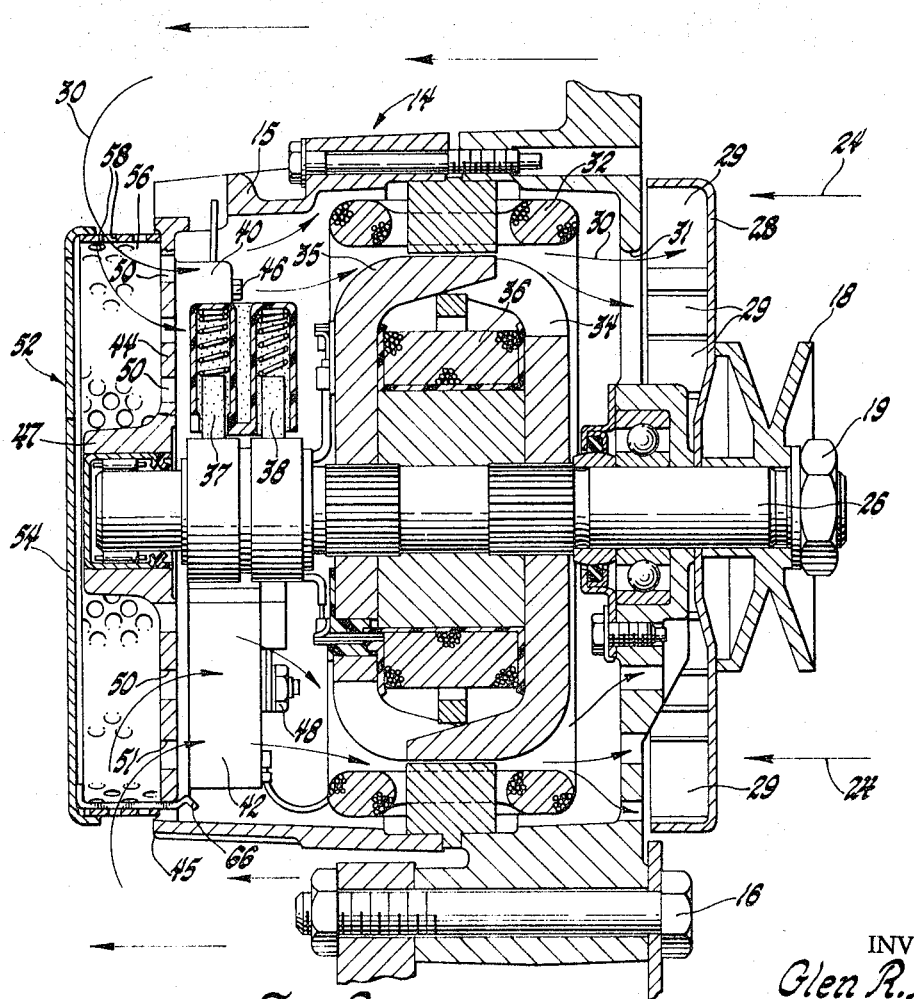
FIG. 2 is a cross section of a typical alternator showing air being drawn radially through the ports of the cover and axially through the ducts of the end wall over he voltage regulator.

As shown in greater detail in FIG. 2, pulley 18 is secured on shaft 26 by nut 19. Also affixed to shaft 26 and rotated thereby is a fan 28, the blades 29 of which are pitched with respect to the direction of rotation of shaft 26 to draw an air stream in the direction of arrows 30 axially through alternator 14 to exhaust at port 31 in the vicinity of fan 28. Air stream 30 is thus drawn across stator windings 32 affixed to the cylindrical housing of alternator 14, across pole pieces 34 and 35 and field coil 36 affixed to and rotating on shaft 26, across brush sets 37 and 38, and across voltage regulator 40 and bridge rectifier 42. The latter are affixed to end wall 44 respectively by bolts 46 and 48 in conductive heat transfer relationship and respectively in the regions of ducts 50 and 51 passing axially through end wall 44. Encompassing the exterior of end wall 44, over hub 47 that extends axially therefrom and journals shaft 26 and over ducts 50 and 51 under regulator 40 and rectifier 42, is a metallic cover 52 having a ribbed radially extending sheet 54 impervious to air flow and axially extending sides 56 perforated over the circumference thereof by holes 58 and contoured to generally engage the contour of a lip 45 at the exterior junction of end wall 44 with cylindrical housing 15 thereof.

Figure 3:
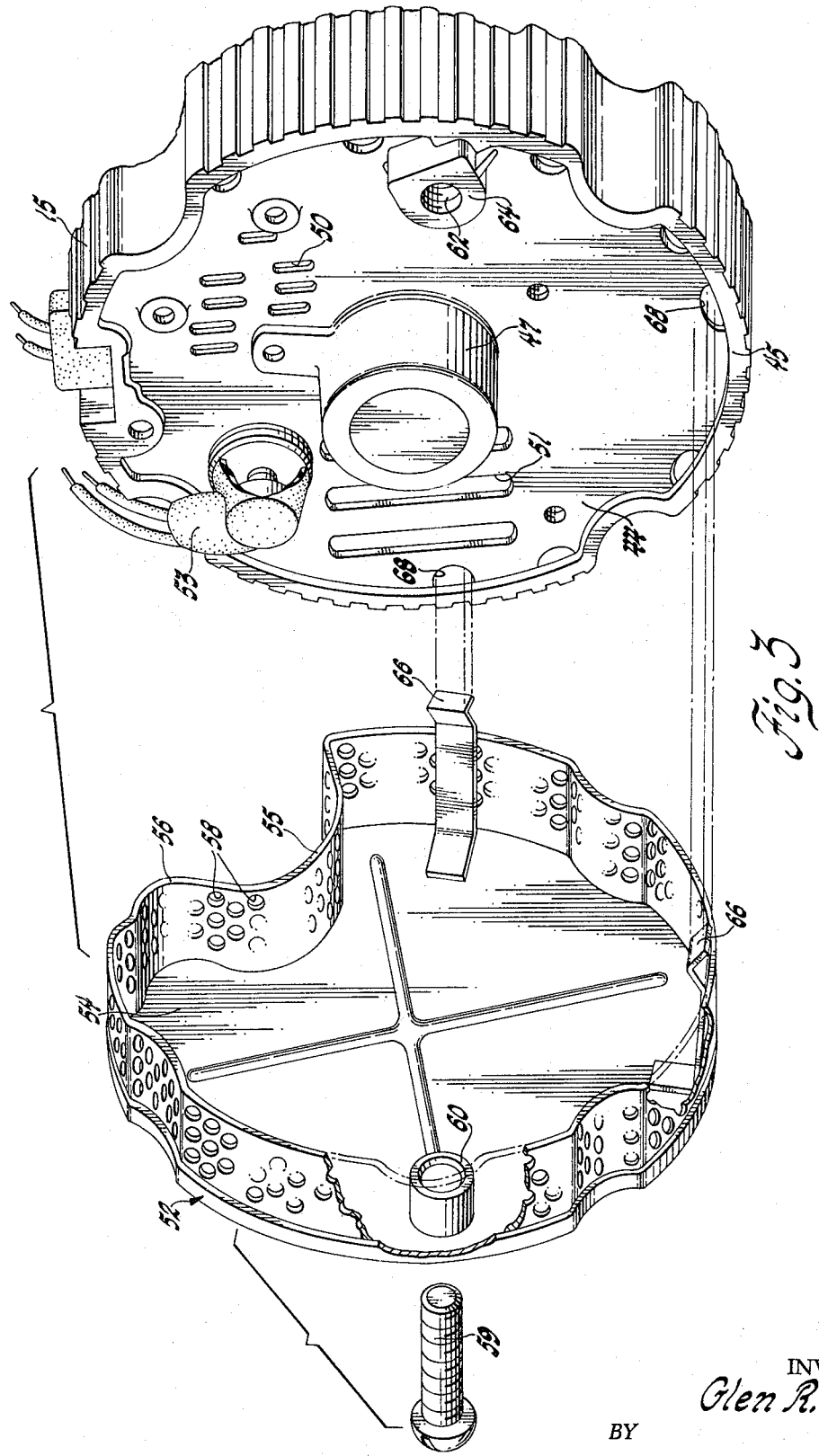
FIG. 3 is an exploded assembly view showing a bolt for positively securing the cover to the end wall and also snaps on the cover for engaging the drain holes in the end wall.

As shown more particularly in exploded assembly view of FIG. 3, cover 52 is secured axially to end wall 44 by bolt 59 engaged from the exterior of cover 52 through bushing 60 on the interior thereof into hole 62 threaded into boss 64 extending axially from the exterior of end wall 44. To prevent sides 56 of cover 52 from being vibrated and generating noise, snap clips 66 are welded to the interior of end sheet 54 and project parallel to sides 56 to project into and engage drain holes 68 extending through end wall 44 in proximity to lip 45.

It will be appreciated that air will be drawn by fan 28 across end wall 44 through ducts 50 and 51 and across regulator 46 and rectifier 42 whether cover 52 is affixed to end wall 44 or not. However, by being attached, cover 52 prevents debris blown by fan 22 in air stream 24 over the exterior sides 15 of alternator 14 from collecting in the low pressure region created by air stream 24 at end wall 44. By thus keeping end wall 44 substantially free of debris, the transfer of heat generated in regulator 40 and rectifier 42 is enhanced. By preventing ducts 50 and 51 from clogging, the maximum volume of the air is drawn through the ducts, thereby ensuring maximum cooling capacity therethrough. Also, maximum convection is maintained from end wall 44 to air stream 30 of the heat conducted to end wall 44 by regulator 40 and rectifier 42. In addition, as the mass of particles of debris in air stream 24 increases, the pressure exerted on such particles by alternator fan 28 in the vicinity of sides 56 of cover 52 will become insufficient to alter the momentum imparted to the particles by air stream 24 and radiator fan 22 by an amount sufficient to change the direction of the velocity of these particles to allow their entry through ports 58 of the sides 56. Thus, particles of debris of greater than a particular mass that would have entered alternator 14 are prevented from doing so by cover 52.

Finally, it is noted that cover 52 is adapted to be readily affixed to the exterior of end wall 44 of a conventional alternator 14 having affixed to the interior of end wall 44 thereof a voltage regulator 40 and bridge rectifier 42. Thus, alternator 14 of the preferred embodiment is representative of a configuration standard for many different applications including those requiring the use of a cover 52. Such standard configuration has a boss 64 to allow more rigid mounting in certain application purposes and drain holes 68 to permit exhaust of rain accumulated water.

Having described one embodiment of the present invention, it is understood that the specific terms and examples used are employed in the descriptive sense and not for the purpose of limitation. Other embodiments of the invention, and modifications thereof, and alternatives thereto may be used. I, therefore, aim in the appended claims to cover such modifications and changes as are within the true spirit and scope of my invention.

What I claim as new and desire to secure by letters of patent of the United States is:

1. A cooling system for a vehicle mounted alternating current generator comprising,
    a. an alternating current generator having cylindrical side portions the ends of which are joined to first and second radially extending end walls having air inlet and air outlet openings formed respectively therein and supporting a rotor therebetween;
    b. semiconductor means attached in conductive heat transfer relationship to the interior of said first end wall;
    c. a generator fan driven by said rotor and disposed adjacent said second end wall for causing air to pass through said generator from said air inlet to said air outlet openings whereby said generator and semiconductor means may be cooled;
    d. a cover member having an imperforate end section and a perforated circumferentially extending side section, said cover side section removably affixed to and axially displacing said end section from the exterior of said first generator end wall, said side and end sections forming therewith an air inlet compartment;
    e. an engine driven fan for said vehicle operative to move air along a predetermined path; and
    f. means supporting said generator in the path of said air circulated by said engine driven fan with said cover member located downstream of said generator fan relative to said air circulated by said engine fan, whereby said perforated side section of said cover permits air circulated by said engine fan to be drawn radially into said compartment by said generator fan and across said end wall and semiconductor means thereon while also cooperating with said imperforate end section to prevent the axial entrance of particles of debris into said generator such particles of debris being substantially prevented from entering the air outlet openings in said second end wall by said generator fan and being carried past said perforated circumferentially extending section of said cover by said engine fan.

* * * * *

PO-1050
(5/69)

UNITED STATES PATENT OFFICE
CERTIFICATE OF CORRECTION

Patent No. 3,666,978                    Dated May 30, 1972

Inventor(s) Glen R. Renner

It is certified that error appears in the above-identified patent and that said Letters Patent are hereby corrected as shown below:

Column 2, Line 28, delete "port", add -- ported end wall --.

Signed and sealed this 24th day of October 1972.

(SEAL)
Attest:

EDWARD M. FLETCHER, JR.                 ROBERT GOTTSCHALK
Attesting Officer                       Commissioner of Patents